US 8,532,098 B2

(12) United States Patent
Reed et al.

(10) Patent No.: US 8,532,098 B2
(45) Date of Patent: Sep. 10, 2013

(54) SYSTEM AND METHOD FOR VIRTUAL CHANNEL COMMUNICATION

(75) Inventors: David Reed, Saratoga, CA (US); Oren Rubinstein, Sunnyvale, CA (US); Brad Simeral, San Francisco, CA (US); Devang Sachdev, Campbell, CA (US); Daphne Das, Campbell, CA (US); Radha Kanekal, Sunnyvale, CA (US); Dennis Ma, Austin, TX (US); Praveen Jain, Santa Clara, CA (US); Manas Mandal, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 272 days.

(21) Appl. No.: 12/628,080

(22) Filed: Nov. 30, 2009

(65) Prior Publication Data

US 2011/0128963 A1   Jun. 2, 2011

(51) Int. Cl.
H04L 12/28 (2006.01)
(52) U.S. Cl.
USPC ............................................. 370/389; 370/414
(58) Field of Classification Search
USPC .................. 370/54, 255, 389, 392, 412–418, 370/254
See application file for complete search history.

(56) References Cited

U.S. PATENT DOCUMENTS

| 6,003,083 | A | 12/1999 | Davies et al. |
|---|---|---|---|
| 6,366,968 | B1 | 4/2002 | Hunsaker |
| 7,099,969 | B2 | 8/2006 | McAfee et al. |
| 7,136,953 | B1 | 11/2006 | Bisson et al. |
| 7,174,411 | B1 | 2/2007 | Ngai |
| 7,225,287 | B2 | 5/2007 | Wooten |
| 7,293,125 | B2 | 11/2007 | McAfee et al. |
| 7,293,127 | B2 | 11/2007 | Caruk |
| 7,324,452 | B2 * | 1/2008 | Xu et al. ........................ 370/236 |
| 7,363,417 | B1 | 4/2008 | Ngai |
| 7,383,412 | B1 | 6/2008 | Diard |
| 7,412,554 | B2 | 8/2008 | Danilak |
| 7,469,311 | B1 | 12/2008 | Tsu et al. |
| 7,480,757 | B2 | 1/2009 | Atherton et al. |
| 7,496,742 | B2 | 2/2009 | Khatri et al. |
| 7,500,041 | B2 | 3/2009 | Danilak |
| 7,536,490 | B2 | 5/2009 | Mao |
| 7,539,801 | B2 | 5/2009 | Xie et al. |
| 7,562,174 | B2 | 7/2009 | Danilak |
| 7,600,112 | B2 | 10/2009 | Khatri et al. |
| 7,617,348 | B2 | 11/2009 | Danilak |
| 7,631,128 | B1 | 12/2009 | Sgrosso et al. |

(Continued)

OTHER PUBLICATIONS

Dictionary.com, Definition of "Monitor", Viewed Jun. 15, 2011.

Primary Examiner — Hong Cho

(57) ABSTRACT

A system and method for communicating over a single virtual channel. The method includes reserving a first group of credits of a credit pool for a first traffic class and a second group of credits of the credit pool for a second traffic class. In addition, a first and second respective groups of tags are reserved from a tag pool for the first and second traffic class. A packet may then be selected from a first buffer for transmission over the virtual channel. The packet may include a traffic indicator of the first traffic class operable to allow the packet to pass a packet of the second traffic class from a second buffer. The method further includes sending the packet over the virtual channel and adjusting the first group of credits and the first group of tags based on having sent a packet of the first traffic class.

20 Claims, 6 Drawing Sheets

(56) References Cited

U.S. PATENT DOCUMENTS

| | | | |
|---|---|---|---|
| 7,660,917 B2 * | 2/2010 | Freking et al. | 710/36 |
| 7,694,049 B2 * | 4/2010 | Goh et al. | 710/107 |
| 7,698,477 B2 * | 4/2010 | Breti et al. | 710/29 |
| 7,705,850 B1 | 4/2010 | Tsu | |
| 7,756,123 B1 | 7/2010 | Huang et al. | |
| 7,777,748 B2 | 8/2010 | Bakalash et al. | |
| 7,788,439 B1 | 8/2010 | Tsu et al. | |
| 7,793,030 B2 | 9/2010 | Jenkins et al. | |
| 7,822,025 B1 * | 10/2010 | Joly | 370/389 |
| 7,849,235 B2 | 12/2010 | Ihara et al. | |
| 2004/0090974 A1 * | 5/2004 | Balakrishnan et al. | 370/412 |
| 2005/0038947 A1 * | 2/2005 | Lueck et al. | 710/315 |
| 2007/0011383 A1 | 1/2007 | Berke et al. | |
| 2008/0072098 A1 | 3/2008 | Hunsaker et al. | |
| 2008/0273545 A1 * | 11/2008 | Sgouros et al. | 370/412 |
| 2009/0006708 A1 | 1/2009 | Lim | |
| 2009/0086747 A1 | 4/2009 | Naven et al. | |
| 2009/0254692 A1 | 10/2009 | Feehrer | |
| 2010/0309918 A1 | 12/2010 | Kumar | |

* cited by examiner

SYSTEM AND METHOD FOR VIRTUAL CHANNEL COMMUNICATION

FIELD OF THE INVENTION

Embodiments of the present invention are generally related to graphics processing unit (GPU) and computer system communication.

BACKGROUND OF THE INVENTION

As computer systems have advanced, graphics processing units (GPUs) have become increasingly advanced. Correspondingly, the interfaces for connecting GPUs to computer systems have become increasingly advanced. Currently, the Peripheral Component Interconnect Express (PCIe) interface is commonly used to connect a GPU to a computer system. PCIe is used in consumer, server, and industrial applications, as a motherboard-level interconnect and as an expansion card interface for add-in boards. The PCIe specification provides for multiple virtual channels for communication between a device, such as a GPU, and other parts of the computer system, such as a chipset.

Unfortunately, while PCIe supports multiple virtual channels, some operating systems only allow the use of a single virtual channel. The use of a single virtual channel for communication between devices is insufficient to prevent communication deadlock in some situations. For example, based on PCIe ordering rules and use of a single virtual channel, there is a dependency when there is a read from a Central Processing Unit (CPU) downstream to an endpoint device, such as a GPU when the requested data is in main memory. The CPU may issue a read to a GPU which needs to be satisfied by reading from main memory when the GPU has used up the local memory and data is therefore stored in the main memory. Based on the ordering rules, the response data to the read request comes from main memory downstream to the GPU. The GPU is trying to handle CPU request and the system may have an ordering rule preventing the GPU from receiving data from main memory until the CPU requests are handled thereby resulting in deadlock because the CPU request to the GPU remains "pending" until satisfied. In other words, the ordering rules implemented by the chipset may not allow traffic to pass other downstream traffic and other traffic dependent on the read completion, thereby causing deadlock. So the GPU in this case is prevented from reading main memory (to respond to the CPU request) while that same CPU request is pending.

Under the PCIe specification, a second virtual channel would solve this problem by removing this dependency between the traffic that is originally from the CPU towards the GPU and traffic initiated by the GPU on the behalf of, and to service, the request that comes from the CPU. However, depending on the operating system, a second virtual channel may not be available for use as the operating system can limit GPU communication to a single virtual channel.

Thus, there is a need to prevent deadlock in such a system when communicating over a single virtual channel.

SUMMARY OF THE INVENTION

Accordingly, what is needed is a system capable of preventing deadlock for communications over a single virtual channel. Embodiments of the present invention utilize traffic prioritization via traffic class as well as credit and tag reservation to allow multiple "effective" channels over a single virtual channel. Embodiments further provide for ensuring appropriate communication performance for packets that have bandwidth or latency requirements. Embodiments of the present invention thus provide for increased performance while avoiding deadlock in a system comprising a CPU and a GPU where the GPU may need to access main memory in response to a CPU request.

In one embodiment, the present invention is implemented as a method for communicating over a communication bus that is configured for a single virtual channel. The method includes reserving a first group of credits of a credit pool for a first traffic class and a second group of credits of the credit pool for a second traffic class. In addition, a first and second respective groups of tags are reserved from a tag pool for the first and second traffic class. A packet may then be selected from a first buffer for transmission over a single virtual channel. The packet may include a traffic indicator of the first traffic class operable to allow the packet to pass (be sent before) a packet of the second traffic class from a second buffer. The method further includes sending the packet over the virtual channel and adjusting the first group of credits and the first group of tags based on having sent a packet of the first traffic class.

In another embodiment, the present invention is implemented as a system for communicating over a single virtual channel. The system includes a credit reservation module for reserving respective portions of a plurality of credits for each of a first buffer and a second buffer and a tag reservation module for reserving respective portions of a plurality of tags for communication of packets from the first buffer and the second buffer. The system further includes a priority module for setting the traffic class of a packet based on a source of packet data being from the first buffer or the second buffer. The setting of a traffic class allows packets of a first traffic class to pass packets of a second traffic class. The respective reserved portions of the plurality of tags are managed by a tag management module relative to the first buffer and the second buffer. The respective portions of reserved credits are managed by a credit management module relative to the first buffer and the second buffer. A packet transmission module is used for selecting and transmitting packets from the first buffer and the second buffer over the single virtual channel.

In yet another embodiment, the present invention is implemented as a graphics processing unit (GPU) system. The GPU system includes a Peripheral Component Interconnect Express (PCIe) interface, a first buffer, and a second buffer. The GPU system further includes an arbiter operable to assign priority to a plurality of packets which allow packets from the first buffer to pass packets from the second buffer sent over a single PCIe virtual channel.

In this manner, embodiments avoid deadlock situations by allowing packets to pass other packets via traffic class settings. Tracking of credits and tags is used to ensure an appropriate number of requests are in flight and a receiver (e.g., chipset) is not overloaded. Embodiments are further able to dynamically enable and disable traffic class, credit, and tag reservations to fine tune communication.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
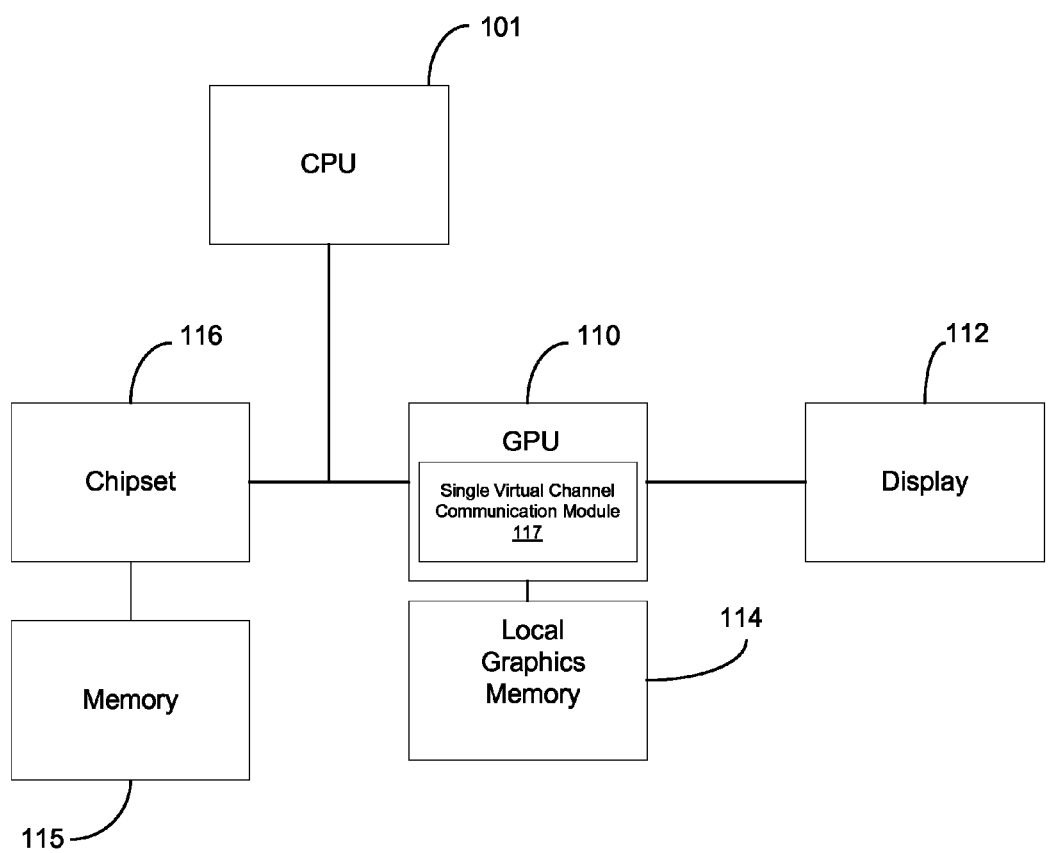
FIG. 1 shows an exemplary computer system, in accordance an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a main memory 115, chipset 116, and at least one graphics processor unit (GPU) 110. The CPU 101 can be coupled to the main memory 115 via a chipset 116 or can be directly coupled to the main memory 115 via a memory controller (not shown) internal to the CPU 101. In one embodiment, chipset 116 includes a memory controller or bridge component. The GPU 110 is coupled to a display 112. One or more additional GPUs can optionally be coupled to system 100 to further increase its computational power. The GPU(s) 110 is coupled to the CPU 101 and the main memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component. Additionally, a local graphics memory 114 can be included for the GPU 110 for high bandwidth graphics data storage. In one embodiment, GPU 110 includes single virtual channel communication module for managing communication over a single PCIe virtual channel.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Embodiments of the present invention allow the benefits of a second virtual channel in systems constrained to a single virtual channel. Embodiments use credit reservation plus traffic class remapping to effectively enable transferring of a second virtual channel's traffic over a single channel. Appropriate communication performance for packets that have bandwidth or latency requirements is also ensured. Embodiments of the present invention thus provide for increased performance while avoiding communication deadlock in system that operate with a single virtual channel. It is appreciated that while virtual channels are described herein, embodiments of the present invention are operable to allow and/or handle communication over any type of single communication channel.

Figure 2:
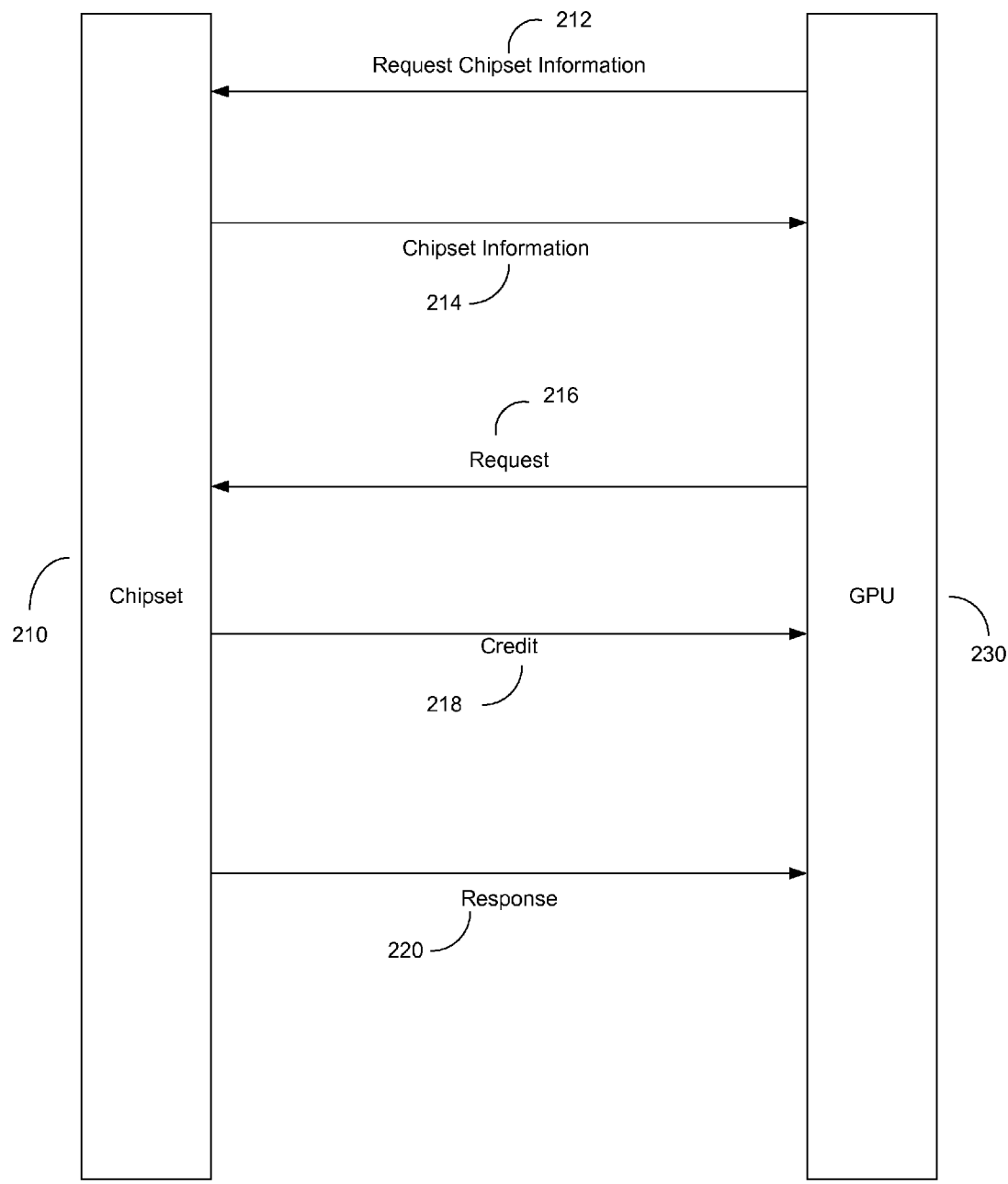
FIG. 2 shows an exemplary communication sequence between a GPU and a chipset, in accordance with an embodiment of the present invention.

FIG. 2 shows an exemplary communication sequence between a graphics processing unit (GPU) and a chipset, in accordance with an embodiment of the present invention. It is appreciated that exemplary communication sequence 200 may be implemented between a variety of devices and is not intended to be limited to a GPU and a chipset. In one embodiment, communication sequence 200 is performed over a single PCIe virtual channel, for instance.

At step 212, GPU 230 requests chipset information from chipset 210. In one embodiment, GPU 230 requests chipset identification to determine whether chipset 230 supports traffic of different classes to pass each other (e.g., via traffic settings in a packet) for communications over a single virtual channel.

At step 214, chipset 210 sends GPU 230 chipset information. In one embodiment, chipset 210 sends identification information which is used by GPU 230 to access a table of the capabilities and supported features of various chipsets. Based on the identification information, GPU 230 determines how many requests can be sent to chipset 210 before buffers or queues of chipset 210 are full. In another embodiment, the GPU driver or system basic input/output system (BIOS) may query the chipset and setup each side of the link between chipset 210 and GPU 230 accordingly.

At step 216, GPU 230 sends a request to chipset 210. The request sent to chipset 210 may include a variety of requests including a request for main memory access (e.g., read or write). In one embodiment, GPU 230 adjusts a credit associated with the number of requests that can be sent to chipset 210. The credits may be part of a credit based request tracking scheme for communication over a PCIe virtual channel. As described herein, GPU 230 may set a traffic class of the request which allows the request to pass other requests in chipset 210.

At step 218, chipset 210 sends GPU 230 a credit. After processing a request or a slot becoming available in a buffer of chipset 210, chipset 210 sends a credit back to GPU 230 which allows GPU 230 to send another request.

At step 220, chipset 210 sends GPU 230 a response. The response may correspond to the result of the request (e.g., data from a memory read). In one embodiment, the response from chipset 210 includes a tag which corresponds to the tag of a request (e.g., request 216). The tag allows GPU 230 to match response 220 to a request (e.g., request 216).

Figure 3:
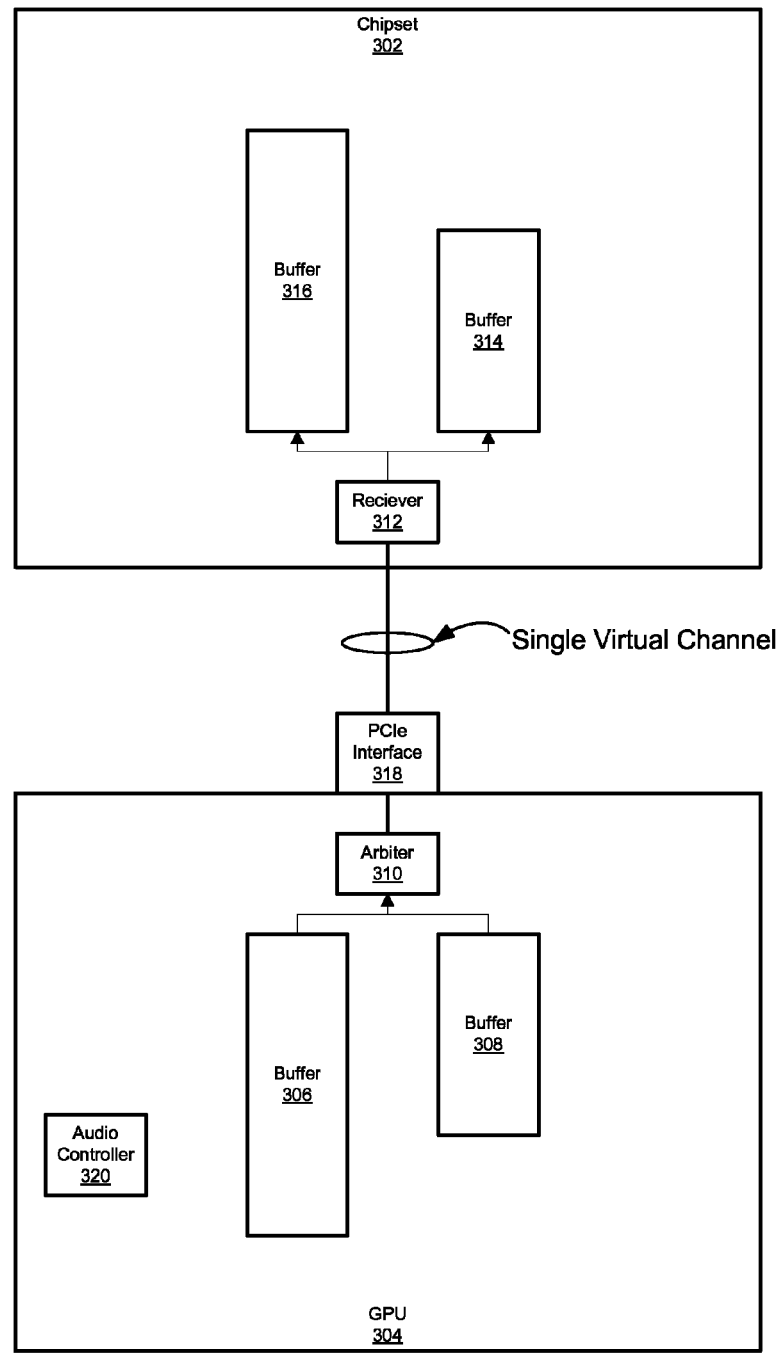
FIG. 3 shows a block diagram of exemplary components of a chipset and a GPU, in accordance with an embodiment of the present invention.

FIG. 3 shows a block diagram of exemplary components of a chipset and a GPU, in accordance with an embodiment of the present invention. Block diagram 300 includes chipset 302, PCIe interface 318, and GPU 304. PCIe interface 318 is configured such that only one virtual channel is available.

Chipset 302 is coupled to GPU 304 via Peripheral Component Interconnect Express (PCIe) interface 318. Chipset 302 includes buffer 316, buffer 314, and receiver 312. Buffers 314 and 316 may be configured in a variety of configurations including First In First Out (FIFO) queue. In one embodiment, buffer 314 has a smaller size or length than buffer 316.

In one embodiment, receiver 312 receives packets from GPU 304 via the single virtual channel. The virtual channel is somewhat bounded by the electrical interface and a portion of the interface itself. Receiver 312 may sort packets for processing based on traffic classes. For example, receiver 312 may send higher traffic class packets to buffer 314. The sorting of packets by traffic classes allows packets of higher traffic classes received by receiver 312 to go around (be sent before) lower traffic class packets. For example, higher class traffic packets may be used to remove a deadlock situation that would otherwise be unable to be solved if certain packets were not able to pass other traffic over the bus.

GPU 304 includes buffer 306, buffer 308, arbiter 310, and optional audio controller 320. Buffers 306 and 308 may be configured in a variety of configurations including a FIFO queue. In one embodiment, GPU 304 internally has two parallel paths to main memory via buffers 306 and 308 which are coupled to chipset 302. Buffer 308 may be smaller than buffer 306. In one embodiment, buffer 308 is used for latency or bandwidth sensitive packets. The internal differentiation between the two paths ends at the PCIe interface as requests need to be sent over a single PCIe channel.

Arbiter 310 of FIG. 3 arbitrates between packets in buffers 306 and 308 in determining which packets are sent out over PCIe interface 318. In one embodiment, arbiter 310 assigns priority to packets which allow packets from buffer 308 to pass packets from buffer 306 sent over a single PCIe virtual channel. Arbiter 310 may assign priority by setting a traffic class of a packet. That is, arbiter 310 may set the traffic class based on the buffer selected for transmission. For example, arbiter 310 may assign a higher traffic class to packets from buffer 308 and a lower traffic class to packets from buffer 306. It is noted that the classification of traffic classes allows the receiving end (e.g., chipset 302) to distinguish between two types of communication over the single virtual channel. It is appreciated that arbiter 310 selections of packets between buffers 306 and 308 allows packets to pass each other on the sending side (e.g., GPU 304) as packets from buffer 308 may be sent more frequently.

Arbiter 310 may arbitrate between packets from buffers 306 and 308 based on reserving a first group of credits for packets from buffer 306 and reserving a second group of credits for packets from buffer 308. Arbiter 310, as described herein, reserves credits for each group corresponding to the length of the buffers in the receiver (e.g., buffer 316 and 318). The selection of packets from buffers 306 and 308 may then be based on how many credits are available for each of buffers 306 and 308 respectively. Thus, as a packet is selected from a buffer, the credits associated with that buffer are dynamically adjusted (e.g., marked as used). Credit counters are maintained by the system.

In one embodiment, upon receiving a credit back (e.g., from chipset 302), arbiter 310 replenishes credits for higher priority groups before replenishing credits for lower priority groups. For example, where buffer 308 is used for higher priority traffic (e.g., higher class traffic), credits will be replenished for the group of credits associated with buffer 308 before the group of credits associated with buffer 306. It is appreciated that a receiver may send back only a single type of credit (e.g., the credit type corresponding to the single virtual channel). It is further appreciated that a deadlock situation as described above would prevent credits from being released.

In addition, arbiter 310 reserves a first group of tags for buffer 306 and a second group of tags for buffer 308. As described herein, tags are used to track outstanding requests and responses to requests (e.g., received from chipset 302). Tags are used by arbiter 310 to control the number of request in flight to chipset 302.

In one embodiment, audio controller 320 provides audio functionality. Audio controller 320 may fetch audio samples from main memory and send the audio samples to speakers or other output device. It is appreciated that arbiter 310 may handle a variety of requests which are latency sensitive. For example, if audio samples do not arrive in time there may be breaks in sound. Requests from audio controller 320 may be placed in buffer 308 and assigned a higher traffic class by arbiter 310. Arbiter 310 may thus allow requests from audio controller 320 to pass other requests from GPU 304. Arbiter 310 thus allows better audio performance via the ability to adjust traffic priority.

Figure 4:
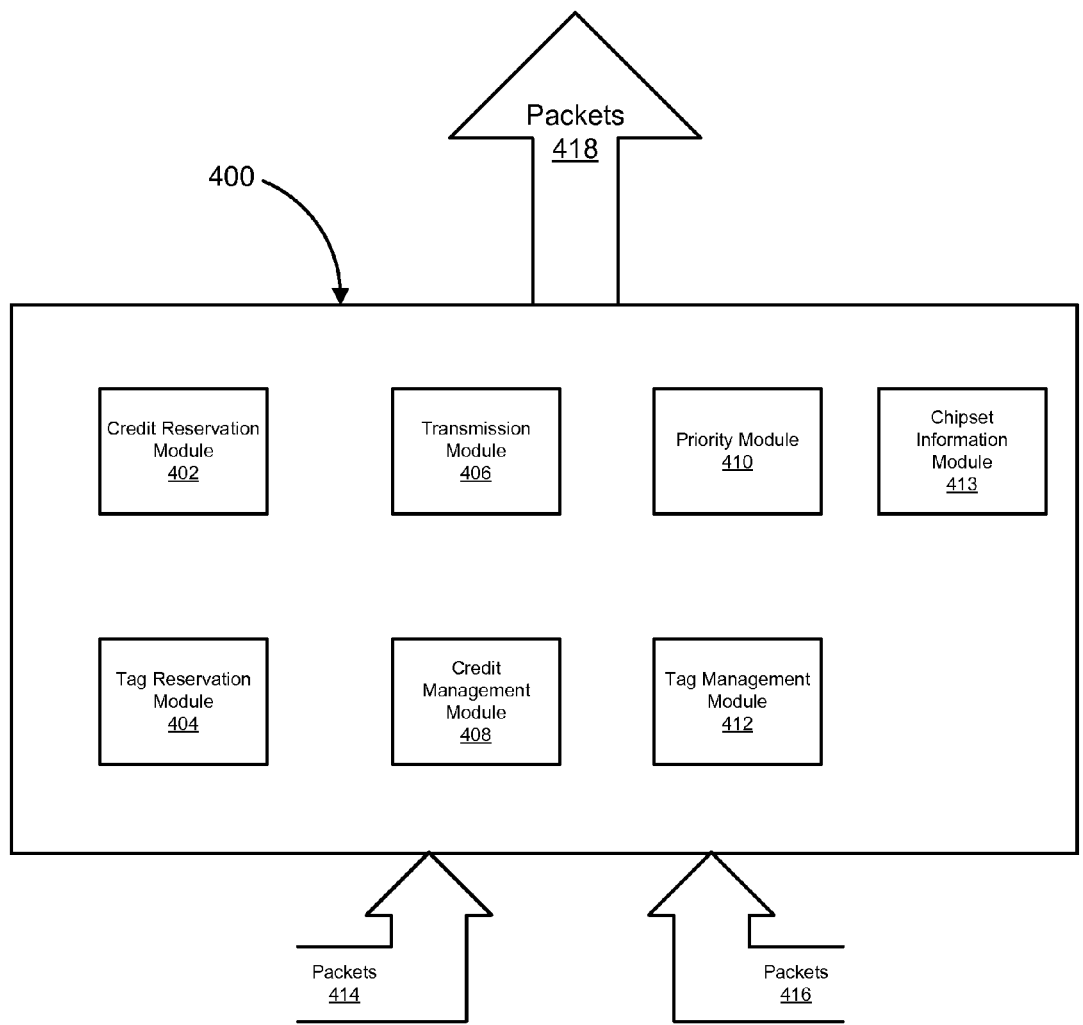
FIG. 4 shows a block diagram of an exemplary arbiter, in accordance with an embodiment of the present invention.

FIG. 4 illustrates example components used by various embodiments of the present invention. Although specific components are disclosed in system 400, it should be appreciated that such components are examples. That is, embodiments of the present invention are well suited to having various other components or variations of the components recited in system 400. It is appreciated that the components in system 400 may operate with other components than those presented, and that not all of the components of system 400 may be required to achieve the goals of system 400.

FIG. 4 shows a block diagram of an exemplary electronic system in accordance with one embodiment of the present invention. System 400 may be implemented in hardware or software. System 400 may further provide arbitration functionality. System 400 includes credit reservation module 402, tag reservation module 404, transmission module 406, credit management module 408, priority module 410, tag management module 412, and chipset information module 413. System 400 receives packets 416 and 414 from a first buffer (e.g., buffer 308) and a second buffer (e.g., buffer 306).

Credit reservation module 402 reserves respective portions of a plurality of credits for each of a first buffer and a second buffer. In one embodiment, communication is performed over a PCIe bus which has a credit based scheme which allows the receiver to signal when more requests can be received (e.g., buffers are not full). The total number of the credits available for reservation for both buffers is based on the sizes of the buffers in the receiver (e.g., chipset 302). In one embodiment, the credit based scheme begins with the receiver sending a packet with information describing the resources (e.g., buffers) of the receiver (e.g., chipset 302). As described herein, the number of credits may be determined based on information from chipset information module 413. Chipset information module 413 identifies a chipset and the communication parameters of the chipset which may include a first buffer length and a second buffer length (e.g., of buffers 316 and 314). Chipset information module 413 may further include table or other datastore having chipset information and associated communication parameters which allows chipset information module 413 to receive chipset product name, lookup, and transmit the number of credits for use with each buffer of the receiver to credit reservation module 402.

It is appreciated that the use of the number of credits for each of the buffers of the receiver allows packets from each corresponding buffer of the transmitter to be sent thereby effectively allowing communication over "two channels" over a bus configured to support only a single virtual channel. The number of credits reserved are thus related or proportional to the size of the buffers in the receiver. For example, if there are sixteen credits then three credits may be reserved for a first buffer and the remaining thirteen credits reserved for the second buffer. As long as one of the three credits is available for packets from the first buffer, packets from the first buffer can be sent.

Priority module 410 sets the traffic class of a packet based on a source of packet data being from a first buffer or a second buffer. As described herein, the setting of the traffic class allows packets of a first traffic class to pass packets of a second traffic class, which can be used to prevent deadlock, control latency, and bandwidth. For example, where eight traffic classes are supported, traffic classes six through eight may be assigned to packets from a first buffer (e.g., used to avoid deadlock or control latency) while lower traffic classes one through five may be assigned to traffic from the second buffer.

Tag reservation module 404 reserves respective portions of a plurality of tags for communication of packets from a first buffer and a second buffer. Each tag is unique for a set of requests and the tags are used to match a response to a request. The number of tags reserved may correspond to the number of credits reserved for each buffer. In one embodiment, a number of consecutive tags are reserved for each buffer. It is appreciated that more tags may be reserved for a group of reserved credits as credits come back upon the receiver having room in a buffer while tags come back via responses which may have a higher latency. In one embodiment, the minimum number of tags reserved is equal the number of credits reserved. In addition, the number of tags may be based on whether extended tags (e.g., extended PCIe tags) are enabled or disabled (e.g., limited to 32 tags).

Tag management module 412 manages the reserved plurality of tags relative to the first buffer and the second buffer. Tag management module 412 tracks tags in use by respective requests from the first and the second buffer, matches responses with requests based on the tags of the responses, and updates the reserved tag pools based on the tags received in responses. Tag management module 412 may signal transmission module 406 to not transmit packets if there is no space or slots in the completion buffer or when all tags are in use. Tag management module 412 may further limit the number of request from the first buffer in conjunction with credit management module 408 to tune the amount of bandwidth allocated to packets from first buffer and prevent traffic from the first buffer from starving out packets from the second buffer.

Credit management module 408 manages the received plurality of credits relative to the first buffer and the second buffer. In one embodiment, credit management module 408 is operable to adjust the portion of the plurality of credits reserved for the first buffer before adjusting the portion of the plurality of credits reserved for the second buffer. That is, credits for the first buffer may be replenished before credits are replenished for the second buffer. Remaining credits that are received after all of credits reserved for the first buffer have been replenished are applied to the credits for the second buffer. It is appreciated that credits received are generic credits which are not tied to a particular buffer.

For example, if there were 32 credits and eight were reserved for the first buffer and 24 credits reserved for the second buffer when eight requests were issued from the first buffer and eight requests were issued from the second buffer, the credits for the first buffer would be depleted and 16 credits remain available for the second buffer. If nine credits are received, credit management module 408 applies eight of the credits to replenish the credits for the first buffer and then applies the remaining credit to credits for the second buffer bringing the available credits to 17 for the second buffer.

Packet transmission module 406 selects and transmits packets 418 from the first and the second buffer. Transmission module 406 may select packets from the buffers based on the number of credits and tags available that are reserved for the respective buffers. For example, packet transmission module 406 may select packets from the second buffer for transmission based on the credits for the first buffer being depleted.

Packet Transmission module 406 supports multiple operating modes which allow fine tuning of performance. The various modes of operation allow embodiments to dynamically enable and disable credit, tag, and traffic class functionality thereby allowing maximum performance and avoiding deadlock. In one embodiment, packet transmission module 406 supports round robin arbitration which allows fine tuning performance as packets are selected from each of the buffers in a round robin manner.

It is appreciated that if too many credits or tags are reserved or too high a priority is assigned to traffic from the first buffer, there may be a negative impact on the performance of the second buffer and therefore the performance of the GPU (e.g., GPU 304). In one mode of operation, the minimum priority in selection of packets is given to packets from the first buffer and as many resources as possible are provided to the second buffer.

In another mode of operation, if the first buffer is used to allocate a certain amount of bandwidth or provide for lower latency traffic (e.g., for an audio controller or other latency sensitive device), it is appreciated that packets from the first buffer may not be given a higher priority as long as there are enough packets in flight to satisfy the bandwidth needs of the first buffer.

Figure 5:
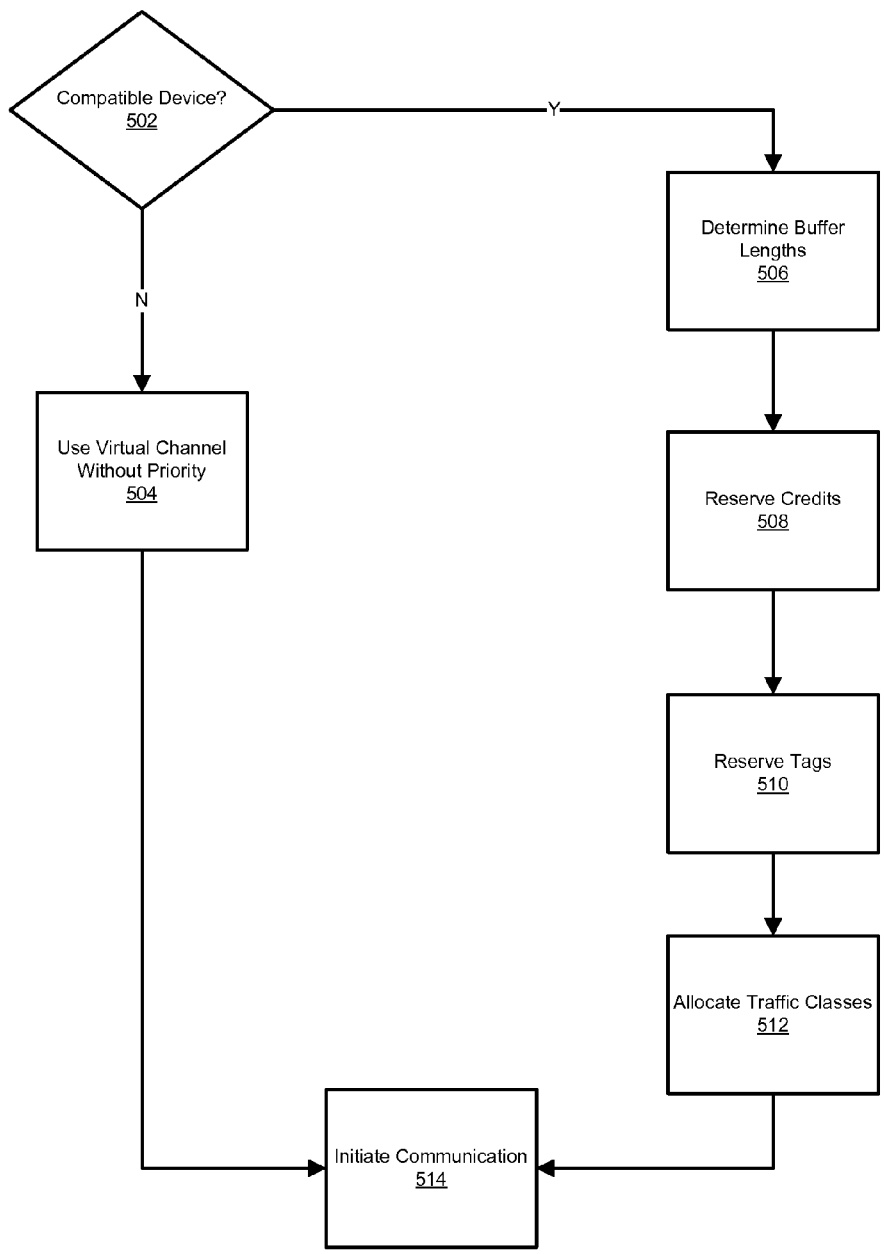
FIG. 5 shows a flowchart of an exemplary communication initialization process, in accordance with an embodiment of the present invention.
Figure 6:
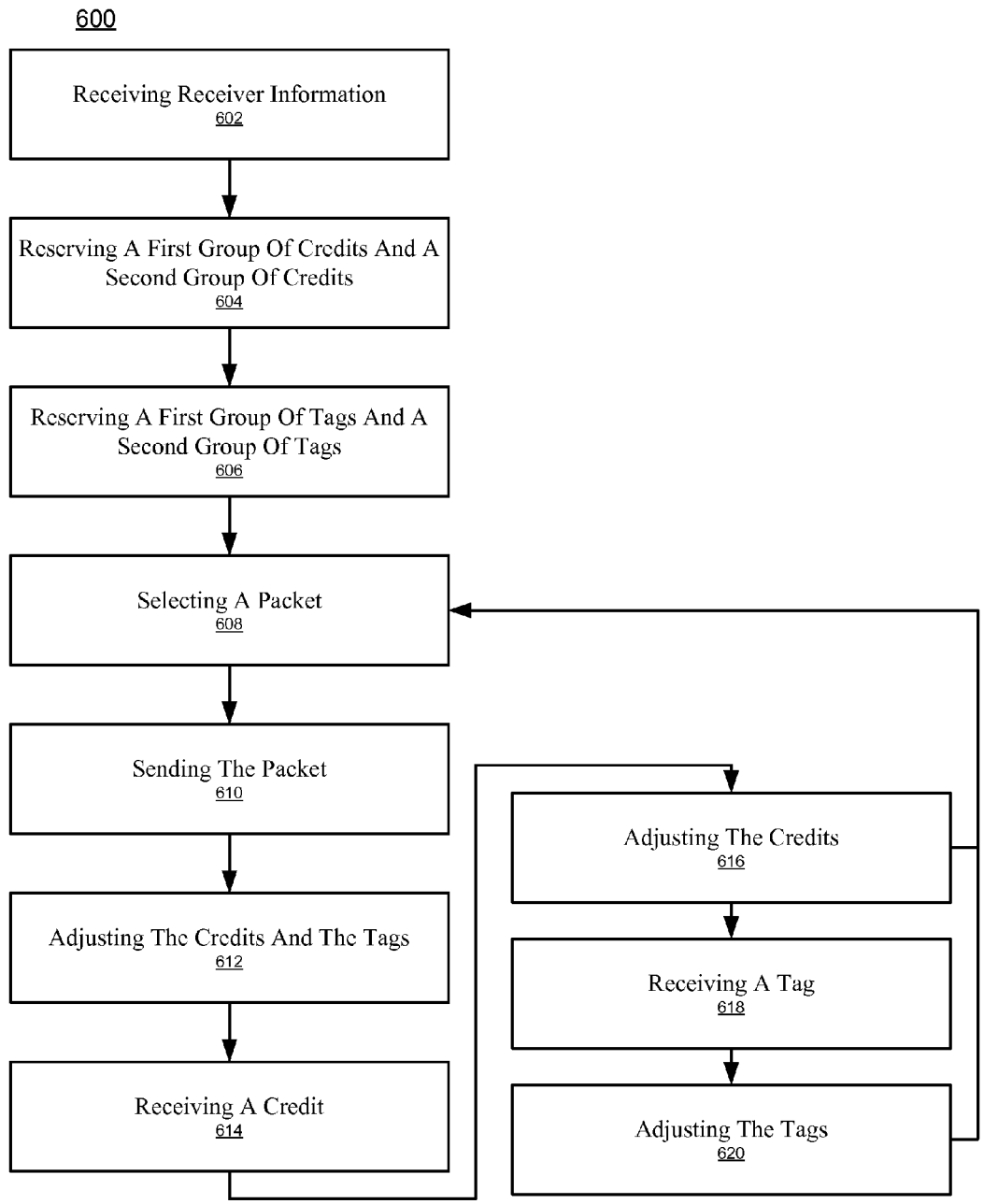
FIG. 6 shows a flowchart of an exemplary computer controlled process for communication over a virtual channel, in accordance with an embodiment of the present invention.

With reference to FIGS. 5-6, flowcharts 500 and 600 illustrate example functions used by various embodiments of the present invention. Although specific function blocks ("blocks") are disclosed in flowcharts 500 and 600, such steps are exemplary. That is, embodiments are well suited to performing various other blocks or variations of the blocks recited in flowcharts 500 and 600. It is appreciated that the blocks in flowcharts 500 and 600 may be performed in an order different than presented, and that not all of the blocks in flowcharts 500 and 600 may be performed.

FIG. 5 shows a flowchart of an exemplary communication initialization process 500, in accordance with an embodiment of the present invention. In one embodiment, process 500 is a computer implemented method. Process 500 may initialize communication settings for communication over a single PCIe virtual channel.

At block 502, whether the receiver (e.g., chipset 302) is a compatible device is determined. If the receiver is a compatible device, block 506 is performed. If the receiver is not a compatible device, block 504 is performed.

At block 504, the transmitting device (e.g., GPU 304) enters a mode to use the virtual channel without priority (e.g., traffic class) assigned to the packets.

At block 506, the lengths of the buffers (e.g., FIFOs) are determined. As described herein, a chipset may transmit information identifying the chipset or information of the number of credits supported and lengths of the buffers.

At block 508, credits are reserved for communication based on the lengths of the buffers of the receiver. As described herein, the credits are reserved for each buffer of the transmitter (e.g., GPU 304).

At block 510, tags are reserved for communication. As described herein, the tags reserved are based on the credits reserved for each respective buffer as well as based on the number of requests to be outstanding for each buffer of the transmitter (e.g., GPU 304). A portion of the credits may be reserved for higher priority traffic and a corresponding portion of the tags may be reserved for tags for higher priority traffic.

At block 512, traffic classes are reserved. As described herein, higher traffic classes may be reserved for higher priority traffic (e.g., from buffer 308) which is allowed by the receiving device (e.g., chipset 302) to pass (sent before) lower priority traffic (e.g., lower traffic class traffic). At block 514, communication is initiated based on the determination of whether the receiver is a compatible device and the reservation of tags, credits, and allocated traffic classes.

FIG. 6 shows a flowchart of an exemplary computer controlled process for communication over a bus configured to support only a single virtual channel, in accordance with an embodiment of the present invention. In one embodiment, process 600 is implemented by an arbiter (e.g., arbiter 310) of a GPU (e.g., GPU 304).

At block 602, receiver information is received. As described herein, the receiver information includes identification information of a receiver (e.g., chipset 302) which is operable for determining a first receiver buffer length (e.g., buffer 314) and a second receiver buffer length (e.g., buffer 316). As described herein, the receiver information and the number of credits allocated to each priority class (e.g., traffic class) may be queried and/or setup by a driver and/or system BIOS.

At block 604, a first group of credits and a second group of credits are reserved. As described herein, the first group of credits may be reserved for a first traffic class (e.g., higher priority traffic class) and the second group of credits is reserved for a second traffic class (e.g., lower priority traffic class). In one embodiment, the first group of credits and the second group of credits may be reserved based on a number of credits issued to the transmitter (e.g., GPU 304) by the receiver (e.g., chipset 302) based on how many entries (e.g., buffer slots) available.

At block 606, a first group of tags and a second group of tags are reserved. As described herein, a first group of tags of a tag pool may be reserved for the first traffic class (e.g., higher traffic class) and a second group of tags of the tag pool are reserved for the second traffic class (e.g., lower traffic class).

At block 608, a packet is selected for transmission. As described herein, a packet may be selected based on various operating modes of an arbiter. The selection may be based on credits and tags are available for each of the respective groups of reserved credits and reserved tags. For example, a packet may be selected from a second buffer (e.g., buffer 306) upon a first buffer being empty (e.g., buffer 308).

In one embodiment, for instance, a packet is selected from a first buffer (e.g., 308) for transmission over a virtual channel and the packet has a traffic indicator indicating the first traffic class (e.g., higher traffic class) which allows the packet to pass a packet of the second traffic class (e.g., lower traffic class) from a second buffer (e.g., buffer 306).

As described herein, packets may further be selected based on the packets having bandwidth or latency requirements. For example, during display refresh where the GPU does not have sufficient local memory available, main memory controlled by the chipset is used to store some display data. In order for the display to be refreshed, the data needs to be received from main memory in time otherwise there will be a visible artifact corresponding to the missing data. Thus, embodiments may select packets (of asynchronous traffic) based on needs of guaranteed bandwidth or latency.

At block 610, the selected packet is sent. As described herein, the packet is sent over a single virtual channel of a PCIe interface.

At block 612, the credits and tags are adjusted. As described herein, the credits and tags are adjusted to track the credits and tags available for the respective groups corresponding to the buffers (e.g., buffers 306 and 308).

At block 614, a credit is received. As described herein, as slots in buffers of the receiver become available, the receiver sends back credits.

At block 616, the credits are adjusted. As described herein, credits received may be used to replenish credits of the higher traffic class group (e.g., buffer 308) before replenishing credits for the lower traffic class group. For example, the lower traffic class group of credits may be adjusted if the higher traffic class group of credits is full. Block 608 or block 618 may then be performed.

At block 618, a tag is received. As described herein, a tag is received in a response packet having the tag which can then be used to match the request with the response.

At block 620, the tags are adjusted. As described herein, the group of tags having the tag that matches the tag that is received is replenished so that it may be reused for another request.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of sending data comprising:
reserving a first group of credits of a credit pool for a first traffic class and a second group of credits of said credit pool for a second traffic class;
reserving a first group of tags of a tag pool for said first traffic class and a second group of tags of said tag pool for said second traffic class;
selecting a packet from a first buffer for transmission over a virtual channel wherein said packet comprises a traffic indicator indicating said first traffic class which allows said packet to pass a packet of said second traffic class from a second buffer;
sending said packet over said virtual channel; and
adjusting said first group of credits and said first group of tags.

2. The method as described in claim 1 further comprising:
receiving receiver information comprising identification information of a receiver.

3. The method as described in claim 2 wherein said identification information comprises chipset identification information operable for determining a first receiver buffer length and a second receiver buffer length.

4. The method as described in claim 1 further comprising:
receiving a credit; and
adjusting said first group of credits if said first group of credits has credits operable to be replenished.

5. The method as described in claim 4 further comprising:
adjusting said second group of credits if said first group of credits is full.

6. The method as described in claim 1 further comprising:
selecting a packet from said second buffer upon said first buffer being empty.

7. The method as described in claim 1 further comprising:
receiving a tag, wherein said tag corresponds to said sent packet;
adjusting one of said first group of tags and said second group of tags based on matching said tag to one of said first group of tags and said second group of tags.

8. A system comprising:
a credit reservation module for reserving a respective portion of a plurality of credits for each of a first buffer and a second buffer;
a tag reservation module for reserving a respective portion of a plurality of tags for communication of packets from said first buffer and said second buffer;
a priority module for setting a traffic class of a packet based on a source of packet data being from one of said first buffer and said second buffer, wherein said setting of a traffic class allows packets of a first traffic class to pass packets of a second traffic class;
a tag management module for managing said plurality of respective tags reserved for said first buffer and said second buffer; and
a credit management module for managing said plurality of respective credits reserved for said first buffer and said second buffer; and
a packet transmission module for selecting and transmitting packets from said first and said second buffer.

9. The system as described in claim 8 further comprising:
a chipset information module for identifying a chipset and communication parameters of said chipset.

10. The method as described in claim 8 wherein said communication parameters comprise a first buffer length and a second buffer length.

11. The method as described in claim 8 wherein said packet from said first buffer are latency sensitive.

12. The method as described in claim 11 wherein said packet is from an audio controller.

13. The method as described in claim 8 wherein said credit management module is operable to adjust said respective portion of said plurality of credits reserved for said first buffer before adjusting said respective portion of said plurality of credits reserved for said second buffer.

14. The method as described in claim 8 wherein said packet transmission module for transmitting packets is operable to select a packet from said second buffer based on said respective portion of credits reserved for said first buffer being depleted.

15. A system comprising:
a graphics processing unit;
a Peripheral Component Interconnect Express (PCIe) interface configured to implement a single PCIe virtual channel;
a first buffer and a second buffer; and
an arbiter operable to assign priority to a plurality of packets which allow packets from said first buffer to pass packets from said second buffer sent over said single PCIe virtual channel.

16. The system as described in claim 15 wherein said arbiter is operable to reserve a first group of credits for packets from said first buffer and reserve a second group of credits for packets from said second buffer.

17. The system as described in claim 15 wherein said arbiter is operable to reserve a first group of tags for packets from said first buffer and reserve a second group of tags for packets from said second buffer.

18. The system as described in claim 15 wherein said arbiter is operable to assign priority via packet traffic class.

19. The system as described in claim 15 wherein said arbiter is operable to replenish credits for the said first group of credits prior to replenishing credits for said second group of credits.

20. The system as described in claim 15 wherein said first buffer comprises latency sensitive packets.

* * * * *